March 3, 1936.   L. A. WELLINGTON   2,032,965
TOOL HOLDER
Original Filed March 25, 1929
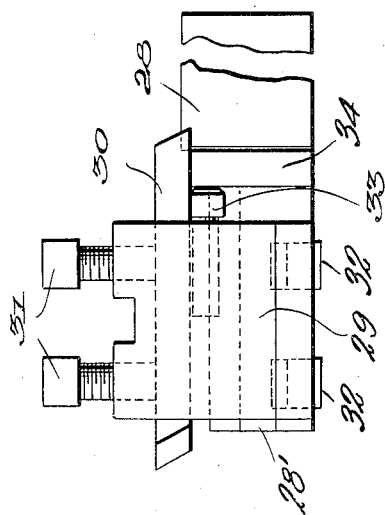
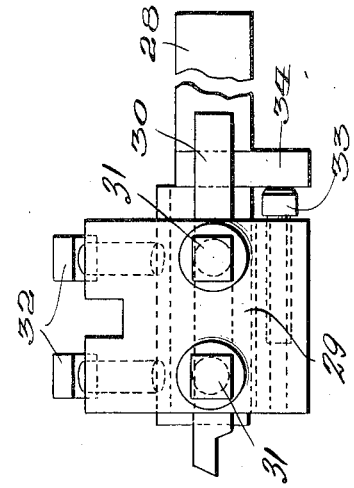
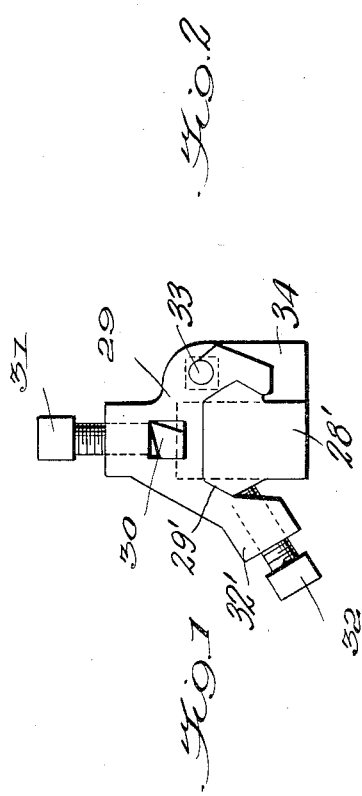
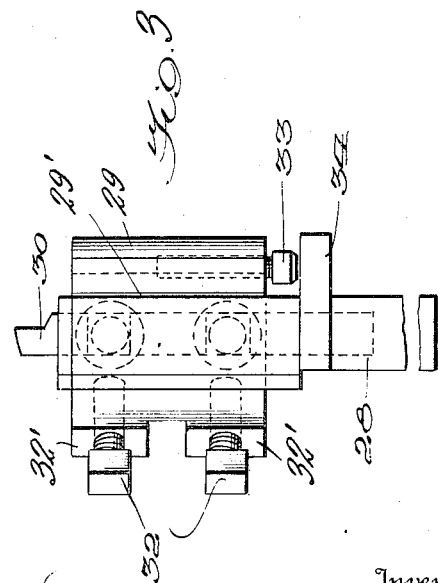
Inventor
Leonard A. Wellington
By Vernon E. Hodge
his Attorney Patented Mar. 3, 1936

2,032,965

UNITED STATES PATENT OFFICE 2,032,965

TOOL HOLDER

Leonard A. Wellington, Keene, N. H.

Original application March 26, 1929, Serial No. 350,034. Divided and this application September 2, 1933, Serial No. 687,949

1 Claim. (Cl. 29—100)

This invention relates to an improvement in tool holders, and is a division of my application on tool holders, filed March 26, 1929, Serial No. 350,034 which has become Patent No. 1,935,493 issued November 14, 1933.

The object of my invention is to provide a head carrying the cutting tool, which head may be removed laterally from its supporting shank and may be adjusted for a predetermined cut of the tool, being removable without disturbing the adjustment. Accordingly several heads may be provided, set to different cuts, any one of which may be used and after being used replaced by another. In substituting the several heads, it is only necessary to lock one of them in place on the shank, the adjustment being preserved, and, therefore, it is unnecessary to make an adjustment for each tool.

In the accompanying drawing,

Fig. 1 is an end elevation of one form of my invention, the head being applied to a shank;

Fig. 2 is a side elevation thereof;

Fig. 3 is a bottom plan view thereof; and

Fig. 4 is a top plan view thereof.

The cutting tool is adapted to be carried by a shank designated 28 in Figs. 1 to 4, which shank should be of sufficient size and shape to fit in a milling, boring, or other machine in which it may be desired to use this invention. The shank should be of sufficient size and sturdiness so as to insure rigidity and reasonable concentricity.

In the form of tool holder shown in Figs. 1 to 4, the tool is adapted to various kinds of work, such as planing, lathe work, etc. In this form, the shank 28 has an irregular shaped end portion 28' on which is slidably mounted a saddle-shaped head 29, having a socket 29' in the underside thereof, and extending longitudinally of the head, which socket is shown to be of such shape as to permit the head to be applied or removed laterally of the shank portion 28'.

The head 29 has a cutting tool 30 secured therein by set screws 31, and by loosening said screws the tool may be removed or adjusted longitudinally relative to the head.

The head 29 is held in place on the shank portion 28' by set screws 32 which extend through bosses 32' at one side of the head and engage a side face of the irregularly shaped portion 28' of the shank.

A set screw 33 is threaded into the rear end of the head 29 in position for its head to abut against a flange 34 carried by the shank 28. This set screw 33 may be adjusted to vary the position of the head 29 on the shank portion 28', especially for fine adjustments, and also to prevent the head from sliding back on the shank when the tool is in use.

This form of tool holder may be adjusted in several different ways, as the tool may be adjusted in the tool holder upon loosening the screws 31, but a finer adjustment may be made by the screw 33. Furthermore, the head may be adjusted on the shank portion 28' not only by the screw 33, but also by loosening the screws 32, or the head may be removed and another substituted therefor, with a different adjustment of the screw 33 or the cutter 30. The screw 33 abutting against the flange 34 assures the correct positioning of the head on the shank portion.

The head 29 may receive the tool in a straight manner as shown in the drawing or it may receive either left or right hand tools for either outside or inside work, or other work as desired. This form of holder may be used for different diameters by adjusting the head relative to the shank or the head may be removed and another replaced either when it is unfit for further use or when it is desired to change the cut by the use of another tool.

With some kinds of work there would not be sufficient room for removal of the head and cutting tool from the shank longitudinally thereof without disturbing the relation between the work and shank. When it is desired to substitute another cutting tool, or a sharpened one, it is only necessary with this invention to remove the head laterally from the shank and substitute another head with a different kind of or sharpened tool, as desired, the substitution being effected also radially of the shank.

By this invention it is possible to use separate tools which may be preadjusted for the different cuts of the work that may be necessary or desirable, or the tools may be capable of adjustment to the desired size, and, being adjusted, may be substituted for others incapable of efficient use.

In other words, with this invention the mounting of the different units is such that they may be inserted or so placed in the operating position as to be used, removed, and replaced as occasion may arise. Any form of cutting or boring-tool may be used in connection with the invention.

I claim:

In a tool-holder, the combination with a supporting shank having a top and approximately V-shaped opposite sides, of a head having a socket therein, said socket having its top and one side approximately fitting the top and one of the V-shaped sides, respectively, of the shank, said socket having an open bottom, and having the side opposite the first-mentioned V-shaped side fitting the top part only of the corresponding V-shaped side of the shank and so inclined away from the lower part of said last-mentioned side for removal of the head from the shank by a lateral angular motion, means carried by the head in position for adjustable engagement with the lower part of the last-mentioned side to hold the head against removal therefrom, and means on said head for holding a tool.

LEONARD A. WELLINGTON.